May 3, 1960  A. E. CUTLER  2,934,835
RADAR SIMULATION OR THE LIKE
Filed Feb. 2, 1955  2 Sheets-Sheet 1
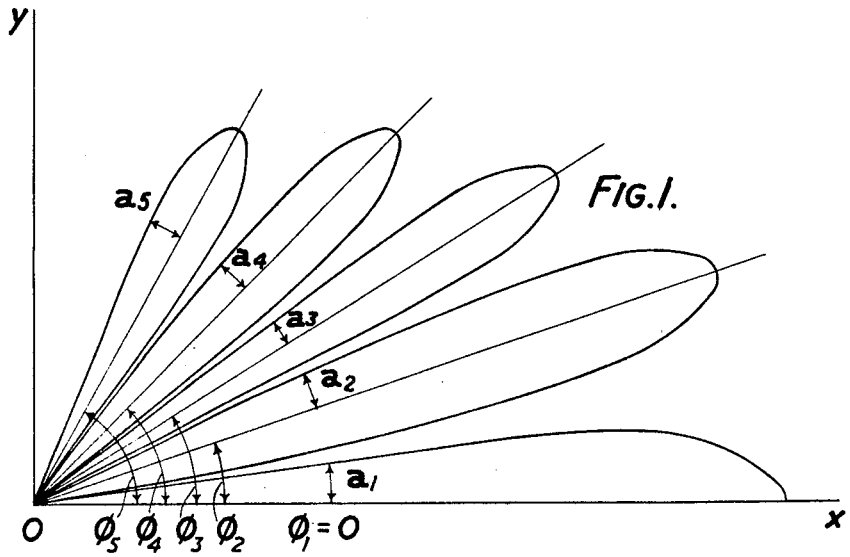
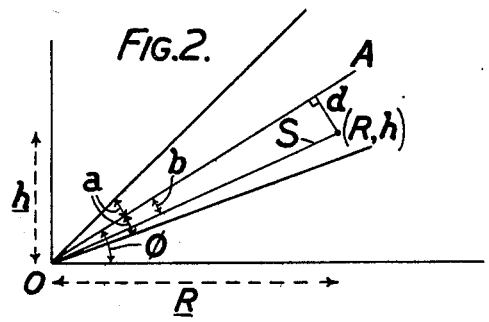
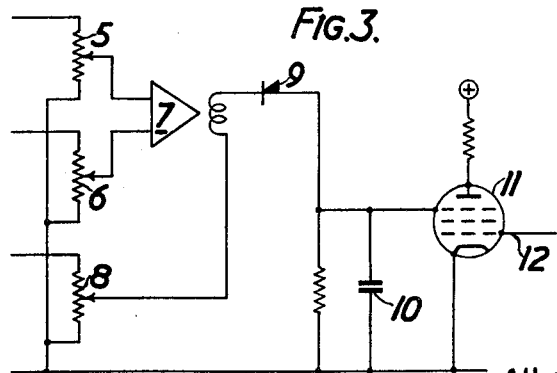
INVENTOR
Albert Ernest Cutler
BY George W. Corey
ATTORNEY

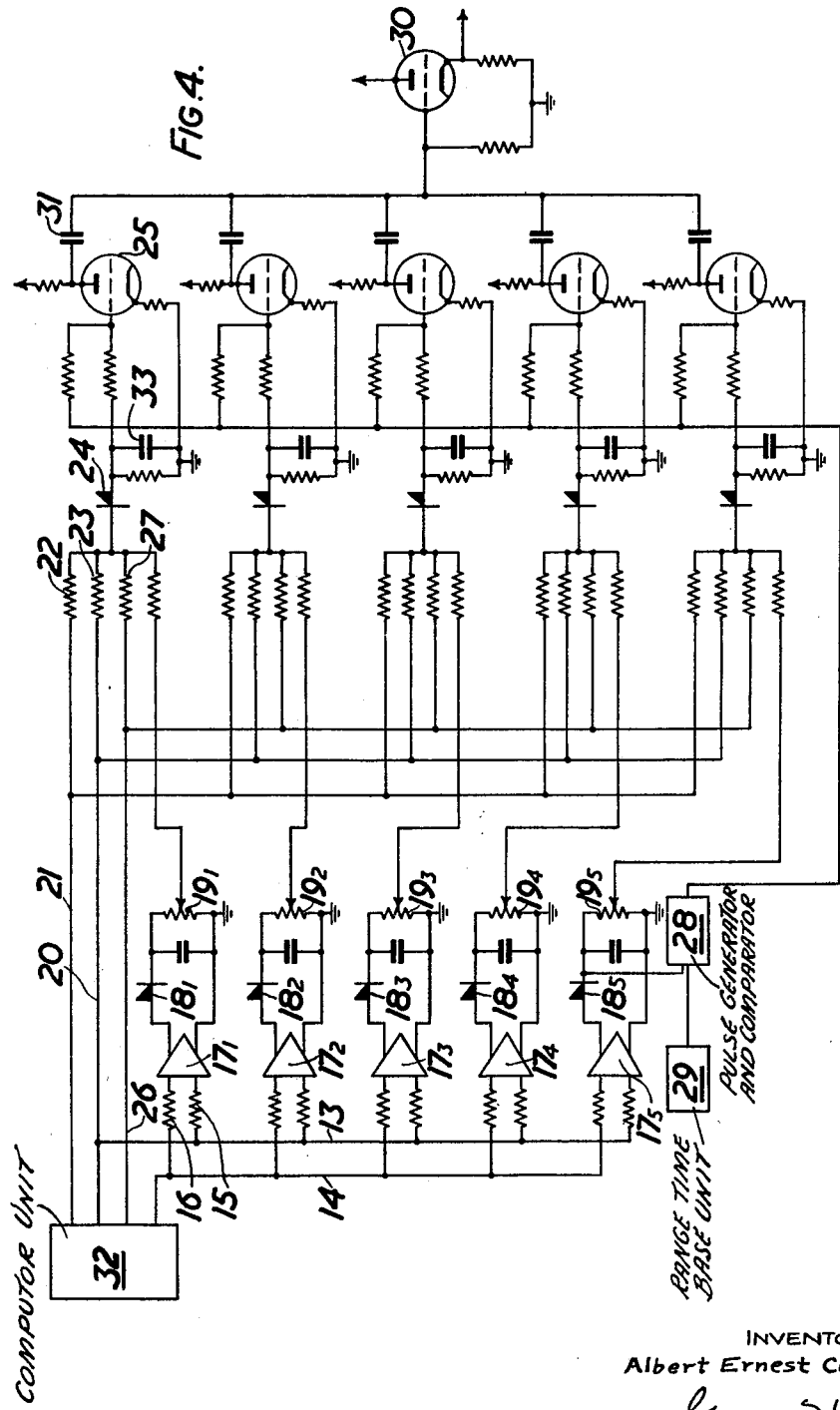

2,934,835

RADAR SIMULATION OR THE LIKE

Albert Ernest Cutler, Crawley, England, assignor to Communications Patents Limited Application February 2, 1955, Serial No. 485,639

Claims priority, application Great Britain February 9, 1954

5 Claims. (Cl. 35—10.4)

This invention relates to radar training devices.

It is a feature of many radio and radar devices including radio communication, radar navigation systems, radar, azdics and audar that the intensity of a received signal varies with the relative orientation of the receiver or reflector from the transmitter and/or with the relative orientation of the transmitter from the receiver. In such systems, a two or three dimensional plot of the equal field strength lines or surfaces shows characteristic ears or lobes, this feature being known as "lobe structure." In radio systems, lobes are exhibited in varying degrees by all aerials, although they are normally more noticeable in the field patterns of multiple dipole assemblies.

It is an object of the invention to provide, in training aids, means for computing whether an object is within or outside a radiation lobe.

It is a further object of the invention to provide apparatus for computing whether an object is within any of a number of lobes in a multi-lobe radiation pattern, and to modify accordingly a signal representing a signal received from the transmitter or reflected by the object.

Another object of the invention is to provide means for modifying an electric signal representing a signal radiated from a transmitter in accordance with both the assumed or computed position of an object with respect to the transmitter and the field strength characteristic of the simulated transmitting aerial and/or receiving aerial.

The apparatus according to the invention may be used for modifying a received signal in accordance with the simulated lobes of a transmitting aerial in a horizontal, vertical, or any intermediate plane.

According to a feature of the invention, a radar training apparatus includes means for modifying a received signal in accordance with the effect of a simulated three-dimensional lobe structure.

The lobe structure may be a feature of the receiving aerial, the transmitting aerial being considered omnidirectional, or the lobe structure may be a feature of both the receiving and transmitting aerials.

According to a further feature of the invention a radar training apparatus comprises means for modifying the received signal in response to simulated rotation of the transmitting aerial.

An embodiment of the invention will now be described, by way of example only, with reference to the accompanying drawings, which illustrate apparatus for producing synthetic echoes similar to those which are produced when an air craft flies through a vertical radar lobe structure consisting of five lobes. In the drawings:

Figure 1 is a field strength diagram;

Figure 2 illustrates the derivation of the equations relating to the position of an aircraft with respect to a single lobe;

Figure 3 illustrates simplified apparatus for producing synthetic echoes due to a single lobe; and Figure 4 illustrates apparatus for producing synthetic echoes due to five lobes.

Figure 1 illustrates a typical example of the vertical field strength, in a determined plane, obtained using a radar dipole assembly with a finite number of dipoles located at O with the axis of the array parallel to O—$x$. The pattern illustrated has five lobes. The axes of the lobe, that is to say, the lines of symmetry in the determined plane, are inclined at angles $\phi_1$, $\phi_2$, $\phi_3$, $\phi_4$ and $\phi_5$ to the horizontal and the semi-beam apertures of the lobes are $a_1$, $a_2$, $a_3$, $a_4$ and $a_5$.

In the apparatus to be described, the effect of each lobe is independently generated and the results are added to produce the effect of the lobe structure as a whole. The problem of a single lobe will now be considered.

It will be seen from Figure 2 that the distance $d$ of a given point (R, $h$), representing the position of an aircraft in the determined plane, from the axis or line of symmetry OA of the beam is given by the relation $$d = S \sin b$$

where S is the slant range of the point from the origin and $b$ the angle between a line joining the point and the origin, and the beam axis.

The width of the semi-beam at range S is given by $S \sin a$, where $a$ is the semi-beam aperture. In order to ascertain whether the aircraft is within the beam, it is therefore necessary to determine whether $$-S \sin a \leqslant S \sin b \leqslant S \sin a$$

i.e. the condition that the aircraft is within the beam is that the distance of the aircraft from the axis of the beam is less than the semi-width of the beam at the appropriate range. This may be expressed as a single condition, $$|S \sin b| \leqslant S \sin a$$
$$|S \sin b| - S \sin a \leqslant 0$$

It may be shown that $$d = S \sin b = R \sin \phi - h \cos \phi$$

and $$S \cos b = R \cos \phi + h \sin \phi$$

where R is the ground range of the aircraft from the beam origin, $h$ the aircraft altitude and $\phi$ the angle of elevation of the beam axis. As a result, the above condition can be expressed as $$|R \sin \phi - h \cos \phi| - S \sin a \leqslant 0$$

A circuit capable of interpreting the above relation is shown in Figure 3. It is assumed that the voltages representing R, $h$ and S are generated separately by any suitable means known to the art for simulating flight movements, such as the computer unit 32 shown in the circuit of Fig. 4. The production of these voltages form no part of the present invention.

If desired, however, a voltage representing $S \cos b$, derived from $S \cos b = R \cos \phi + h \sin \phi$, may be used in place of one representing S, since $S \cos b$ is approximately equal to S when $b$ is small, i.e. when the aircraft is near the beam.

Antiphase A.C. voltages R and $h$ are applied to two potentiometers 5 and 6 respectively, these potentiometers being adjusted to provide at their wipers output voltages representing $R \sin \phi$ and $h \cos \phi$ respectively. These voltages are added algebraically in a summing amplifier 7 to give a difference output the amplitude of which represents $S \sin b$ and the phase of which corresponds to that of the voltage representing $h$ or that representing R according to whether the aircraft is above or below the beam axis. A positive D.C. voltage representing the slant range S is applied to a potentiometer 8 the wiper of which is set so as to provide an output voltage representing $S \sin a$. The D.C. voltage $S \sin a$ is used to bias a diode 9 to which the A.C. signal from the amplifier 7 is also applied. Independently of the phase of $S \sin b$, the diode will conduct when the magnitude of the negative peaks of the A.C. waveform is greater than the positive bias, and a negative voltage is developed across a capacitor 10 when the deviation $S \sin b$ is greater than $S \sin a$ i.e. when the aircraft is outside the beam.

This voltage is used to bias a variable gain amplifier 11 which serves to amplify a signal which is applied to the conductor 12 and which represents the signal from the transmitter. The signal borne by the conductor 12 is such as to cause the receiving means to simulate the required conditions and may be formed by any suitable known means such as the pulse generator and comparator 28 shown in the circuit of Fig. 4. The effect of the variation of this bias voltage is that the gain of the amplifier 11 is reduced (simulating fading of the signal) when the aircraft is at the edge of the beam because the magnitude of the negative peaks of the A.C. waveform becomes exactly equal to the positive bias at this time. The amplifier is cut off when the aircraft is outside the beam due to the fact that when this occurs, the magnitude of the negative peaks of the A.C. waveform becomes greater than the positive bias. While the aircraft is within the beam the signal strength is substantially constant as the positive bias remains greater than the magnitude of the negative peaks of the A.C. waveform throughout this period.

If the beam has no section in which the intensity is substantially constant the biasing voltage $S \sin a$ is not necessary. The biasing signal for the amplifier 11 is then obtained directly by rectifying the $S \sin b$ output.

Figure 4 shows a circuit in which the same principle is applied to a case in which there are five lobes to be considered. The summing amplifier techniques employed in this circuit are typical and known to those skilled in the art. The circuit features involved in carrying out these techniques are disclosed in British Patent No. 593,354 dated October 15, 1947.

In-phase A.C. voltages representing R and $h$ are applied from a computer unit 32 via conductors 13 and 14 to combinations of weighting and summing resistors such as 15 and 16 in the five amplifiers $17_1$ to $17_5$, the resistors being so chosen that the output voltages generated by the amplifiers represent the sums $$R \cos \phi_n + h \sin \phi_n = S \cos b_n$$

where $n$ represents the lobe numbers 1, 2, 3, 4 and 5, the values of $\phi_1$, $\phi_2$, etc., being assumed constant.

The voltages representing these sums are rectified by the rectifiers $18_1$ to $18_5$ to give negative D.C. voltages representing $S \cos b_n$, these voltages being fed to potentiometers $19_1$ to $19_5$ which are preset according to the properties of the lobes to be assumed by being adjusted in accordance with the beam semi-apertures $a_1$ to $a_5$ (Fig. 1) respectively. The potentiometers $19_1$ to $19_5$ are contoured to give outputs which vary as the tangents of the angles represented by the positions of their wipers, the output voltages from these potentiometers representing the quantities $S \cos b_n \tan a_n$.

It will be noted that as $b_n$ approaches $a_n$ i.e. as the aircraft approaches the edge of a beam, $$S \cos b_n \tan a_n \rightarrow S \cos a_n \tan a_n = S \sin a_n$$

Antiphase A.C. voltages R and $h$ are fed from the computer unit 32 by way of conductors 20 and 21 to five other combinations of weighting and summing resistors such as 22 and 23. To take into account the effect on the altitude of the aircraft of earth curvature, a further A.C. voltage representing $R^2$ which varies with R, is applied to the summing circuit by way of a conductor 26 and a summing and weighting resistor 27, the latter being so chosen that a quantity $$\frac{R^2}{D} \cos \phi_n$$

is added to the algebraic sum of the quantities $R \sin \phi_n$ and $-h \cos \phi_n$, where D has a value representative of the diameter of the earth. The resultant of the A.C. voltages is therefore $$R \sin \phi_n - h \cos \phi_n + \frac{R^2}{D} \cos \phi_n = S \sin b_n$$

and to this voltage is added the negative D.C. bias representing $S \cos b_n \tan a_n$, the resultants being fed to rectifiers such as 24 to determine $$S \cos b_n \tan a_n \geq \left| R \sin \phi_n - h \cos \phi_n + \frac{R^2}{D} \cos \phi_n \right|$$

When the aircraft is outside a beam, and the quantity on the right-hand side of the expression is greater than that on the left-hand side, the corresponding rectifier 24 conducts and a negative voltage is developed across a capacitor such as 33 and biases a corresponding variable gain amplifier such as 25.

Thus when the aircraft is not in any of the five lobes all the amplifiers 25 are cut off. When the aircraft is in a lobe, the corresponding amplifier 25 conducts and the other four are non-conducting.

In this radar embodiment, the signals which are amplified by the variable gain amplifiers 25 are pulse signals derived from a pulse generator and comparator 28 (e.g. a multiar circuit such as disclosed in said British Patent No. 583,553 or "Time Bases," by O. S. Puckle, 2nd edition, pages 356–360) controlled jointly by a signal representing the slant range S and a sawtooth signal from the range time base unit 29, the pulses being delayed in proportion to the range S.

In the embodiment shown, a voltage $S \cos b_5$ (the output of the rectifier $18_5$) is applied to the comparator 28, with the sawtooth range signal, this quantity being approximately equal to S. Any of the voltages $S \cos b_n$ may be used for S in the comparator 28 since all the lobes of such a radar beam are contained within a very small angle of elevation (in Figure 1, the scale of the $y$ axis is greatly exaggerated for the sake of clarity), and since pulses are only required when the aircraft is within this angle.

The outputs of the variable gain amplifiers are combined in the valve 30 so as to give the effect of the five lobes in a single output. As previously indicated, the outputs of such amplifiers will depend on whether or not aircraft is in or outside each of the lobes.

In a radar system the strength of a received signal varies as the inverse fourth power law of range, and a further variable gain amplifier would normally follow valve 30 to produce this variation, this circuit being biased by the range voltage S.

In receiver-transmitter systems, the variation of the signal strength with range follows the inverse square law.

When there is a noticeable diminution in effective range from lobe to lobe of a system as described above, variable gain amplifiers to produce the effect of range are inserted between the valves 25 and the summing capacitors 31, the characteristics being so selected that their output signals change to the required varying extents with slant range.

Although the system has been described with reference to a vertical lobe structure, it is obvious that it can be applied equally well to a horizontal lobe structure, or to a lobe structure in any intermediate plane.

If the effect of a three-dimensional lobe structure is to be simulated, the apparatus described above may be duplicated, the second apparatus being used to further modify the signals of the first apparatus, for example from the value 30, in accordance with the horizontal lobe structure.

It will be obvious that the apparatus as described can be applied equally well if the receiving aerial has a lobe structure and the transmitting aerial is omnidirectional, the distance of the transmitter from an axis of a lobe of the receiving aerial being represented by an A.C. voltage and the semi-width of this lobe by a D.C. voltage, or if both the transmitting and receiving aerials have multi-lobe field strength patterns. In the latter case, the apparatus described above is duplicated, the first apparatus modifying the signal in accordance with the transmitter lobe structure (for example), the receiving aerial being assumed omnidirectional, and the second apparatus further modifying the signal in accordance with the receiver lobe structure, so that the signal is only applied to the receiver when the assumed position of the aircraft is within a zone of overlap of the reception and transmission field strength patterns.

If the aerial responsible for the lobe structure is rotating the fixed resistors which have been used to modify R and $h$ in accordance with the sine and cosine of $\phi$ may be replaced by suitably contoured potentiometers, the wipers of which are driven at the same speed as and in angular synchronism with the scanning aerial.

What I claim is:

1. Apparatus for simulating the reception of radiated signals the field strength pattern of which shows one or more lobes, comprising means serving as a receiver and provided with electric signals representing such radiated signals, means adapted to generate electrical quantities representing the co-ordinates of the assumed position of an object relative to a line of symmetry of a lobe, means pertaining to each of a plurality of lobes to modify these electrical quantities as functions of the direction of the corresponding line of symmetry, means summing the electrical quantities which represent coordinates perpendicular to the said direction to determine the distance of the object from the line of symmetry, means to generate a second electrical quantity representing the semi-width of the lobe at the assumed position of the object, means to compare said two electrical quantities to derive a control signal, and means controlled by said control signal to control said means serving as the receiver and thereby to control the electric signals representing the radiated signals.

2. Apparatus as claimed in claim 1, including means arranged to sum the electrical quantities which represent co-ordinates in the direction of the line of symmetry of a lobe to provide a further electrical quantity which, when the object is near the lobe, represents the range of the object.

3. Apparatus for simulating the reception of radiated signals the field strength pattern of which shows one or more lobes, comprising means serving as a receiver and provided with electric signals representing such radiated signals, means pertaining to each of a plurality of lobes, to provide an alternating electric potential representing the assumed position of an object with respect to the corresponding line of symmetry of the respective lobe, the magnitude of the alternating potential representing the distance of the object or source from the line and its phase being determined according to the side of the line on which the object or source is assumed to be located in the said plane, means to provide a steady potential representative of the semi-width of the lobe at the assumed position of the object, means to compare said two electrical quantities to derive a control signal including a non-linear current carrying device to which the alternating and steady potentials are applied, the non-linear device being arranged so that it produces an indication, by its condition of conduction, when the object or source is within the corresponding lobe, and means controlled by said control signal to control said means serving as the receiver and thereby to control the electric signals representing the radiated signals.

4. Apparatus as claimed in claim 3 in which the non-linear current-carrying device is a diode rectifier.

5. Apparatus as claimed in claim 4 including an amplifier to which there are applied signals representing signals propagated in the lobe, the amplifier having an input circuit to which the output of the rectifier is applied and which includes a capacitor which is negatively charged when the alternating potential exceeds the steady potential, whereby the amplifier is rendered non-conducting when the assumed position of the object is outside the lobe.

References Cited in the file of this patent

UNITED STATES PATENTS

| 2,522,541 | Saxton et al. | Sept. 19, 1950 |
| 2,555,442 | Hales | June 5, 1951 |
| 2,627,673 | Droz | Feb. 10, 1953 |
| 2,677,199 | Droz | May 4, 1954 |
| 2,693,647 | Bolster et al. | Nov. 9, 1954 |
| 2,716,234 | Lester et al. | Aug. 23, 1955 |
| 2,721,397 | Gallo | Oct. 25, 1955 |

OTHER REFERENCES

Dummer: Aids to Training—The Design of Radar Synthetic Training Devices for the R.A.F.—Proceedings of Institution of Electrical Engineers (British), Part 3, March 1949, pages 101 to 112.